US006785079B2

(12) United States Patent
Brannon et al.

(10) Patent No.: US 6,785,079 B2
(45) Date of Patent: Aug. 31, 2004

(54) METHOD AND APPARATUS FOR ESTIMATING THE FLYHEIGHT OF AN AIRBEARING SLIDER IN A STORAGE DEVICE

(75) Inventors: James Hammond Brannon, Palo Alto, CA (US); Hal Hjalmar Ottesen, Rochester, MN (US); Gordon James Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 322 days.

(21) Appl. No.: 09/811,287

(22) Filed: Mar. 16, 2001

(65) Prior Publication Data

US 2002/0145818 A1 Oct. 10, 2002

(51) Int. Cl.$^7$ ............................................... G11B 21/02
(52) U.S. Cl. ....................................................... 360/75
(58) Field of Search ...................... 360/75, 135, 97.01, 360/131; 73/1.89, 104, 105

(56) References Cited

U.S. PATENT DOCUMENTS

| | | | |
|---|---|---|---|
| 4,777,544 A | * 10/1988 | Brown et al. ................. 360/75 |
| 5,062,021 A | * 10/1991 | Ranjan et al. ............... 360/135 |
| 5,168,413 A | * 12/1992 | Coker et al. ................. 360/137 |
| 5,251,082 A | 10/1993 | Elliott et al. ............. 360/98.07 |
| 5,412,519 A | * 5/1995 | Buettner et al. ......... 360/73.03 |
| 5,482,497 A | * 1/1996 | Gonnella et al. ............. 451/57 |
| 5,504,646 A | * 4/1996 | Tanaka et al. .............. 360/135 |
| 5,550,696 A | * 8/1996 | Nguyen ....................... 360/135 |
| 5,729,399 A | * 3/1998 | Albrecht et al. ............... 360/75 |
| 5,739,972 A | 4/1998 | Smith et al. ............. 360/77.03 |
| 5,751,510 A | 5/1998 | Smith et al. ................. 360/67 |
| 5,838,514 A | 11/1998 | Smith et al. .................. 360/75 |
| 5,872,676 A | 2/1999 | Smith et al. ............. 360/77.03 |
| 5,930,091 A | * 7/1999 | Ono et al. ................... 360/135 |
| 6,084,754 A | 7/2000 | Smith et al. ................. 360/135 |
| 6,088,176 A | 7/2000 | Smith et al. .................. 360/46 |
| 6,164,118 A | * 12/2000 | Suzuki et al. ................ 73/1.89 |
| 6,275,345 B1 | * 8/2001 | Ottesen et al. ................. 360/25 |
| 6,404,590 B1 | * 6/2002 | Kuo et al. ................... 360/135 |
| 6,408,677 B1 | * 6/2002 | Suzuki ....................... 73/1.89 |

OTHER PUBLICATIONS

Tanaka et al., Characterization of Magnetizing Process for Pre–Embossed Servo Pattern of Plastic Hard Disks, I.E.E.E. Transactions on Magnetics 4209 (vol. 30, No. 2, Nov. 1994).

(List continued on next page.)

Primary Examiner—David Hudspeth
Assistant Examiner—K. Wong
(74) Attorney, Agent, or Firm—James R. Nock; Lewis L. Nunnelley; Rambod Nader

(57) ABSTRACT

A method and apparatus for estimating the flyheight of an airbearing slider in a storage device. The slider floats on an airbearing over a rotating storage disk. The storage disk includes a washboard-sequence having washboard-sections each comprising surface profile variations having a different pitch. The pitches are selected from within a range of values likely to excite an airbearing resonance of the slider as the storage disk rotates at a rated storage disk velocity. For each of the washboard-sections, a maximum amplitude of flyheight modulation of the slider resulting from the slider floating over that washboard-section is measured. A determination is made of which washboard-section caused the largest measured flyheight modulation. The washboard-section having a pitch that provides an excitation frequency (when the disk is rotated at the rated storage disk velocity) that is closest to the actual airbearing resonance frequency of the slider will produce the largest flyheight modulation. The result of this determination is used to estimate the flyheight of the slider. For example, the flyheight may be estimated using an empirical formula that relates the flyheight and the resonance frequency. Once the flyheight is estimated, a determination may be made of whether the flyheight is unsatisfactory, e.g., below a minimum flyheight or decreasing. Appropriate action may be taken when the flyheight is unsatisfactory, such as notifying the user and/or scrubbing the slider. Accordingly, catastrophic head-crash may be avoided and the useful life of the storage device extended.

8 Claims, 11 Drawing Sheets

OTHER PUBLICATIONS

J. Brannon, "Excimer Laser Ablation and Etching," Chapter 4, Book M-10 of the American Vacuum Society Monograph Series, AVS Press, 1993.

J. Brannon, Appl. Phys. A, vol. 46, pp 39–50 (1988).

K. Daree et al., Glass Technology, vol. 18, pp. 19–20 (1977).

J. Brannon, J. Phys. Chem., vol. 90, pp. 1784–1789 (1986).

D. J. Ehrich et al., J. Vac. Sci. Technol. B, vol. 3, pp. 1–8 (1985).

P. Baumgart et al., IEEE Trans. Mag., vol. 31, p. 2946 (1995).

A. C. Tam et al., IEEE Trans. Mag., vol. 33, pp. 3181–3183 (1997).

* cited by examiner

METHOD AND APPARATUS FOR ESTIMATING THE FLYHEIGHT OF AN AIRBEARING SLIDER IN A STORAGE DEVICE

CROSS-REFERENCE TO RELATED APPLICATION

This patent application is related to IBM Docket No. ROC9-2000-0210-US 1, filed concurrently, entitled "Method and Apparatus for Estimating the Flyheight of an Airbearing Slider in a Storage Device using Variable Spindle Velocity", which is assigned to the assignee of the instant application.

FIELD OF THE INVENTION

The present invention relates in general to data storage systems. In particular, the present invention relates to a method and apparatus for estimating the flyheight of an airbearing slider in a storage device using a washboard-sequence of washboard-sections provided on a surface of a storage disk.

BACKGROUND

A typical magnetic data storage system includes a magnetic medium for storing data in magnetic form and a transducer used to write and read magnetic data respectively to and from the medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

The actuator assembly typically includes a coil assembly and a plurality of outwardly extending arms having flexible suspensions with one or more transducers and slider bodies being mounted on the suspensions. The suspensions are interleaved within the stack of rotating disks, typically using an arm assembly (E-block) mounted to the actuator assembly. The coil assembly, typically a voice coil motor (VCM), is also mounted to the actuator assembly diametrically opposite the actuator arms. The coil assembly generally interacts with a permanent magnet structure, and is responsive to a transducer positioning controller.

In a typical digital magnetic data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One of the information fields is typically designated for storing data, while other fields contain track and sector identification and synchronization information, for example. Data is transferred to, and retrieved from, specified track and sector locations by the transducers which follow a given track and may move from track to track, typically under servo control of a position controller.

The head slider body is typically designed as an aerodynamic lifting body that lifts the transducer off the surface of the disk as the rate of spindle motor rotation increases, and causes the transducer to hover above the disk on an airbearing cushion produced by high speed disk rotation. The separation distance between the transducer and the disk, typically 0.1 microns or less, is commonly referred to as head-to-disk spacing or flyheight.

As disk storage devices become more sophisticated, flyheights are becoming smaller and smaller. Unfortunately, this trend of reduced flyheights increases the likelihood of catastrophic head-crash, in which the head makes physical contact with the disk surface and the resulting damage is sufficient to cause data loss. This problem is made worse when combined with the concurrent trends of higher areal recording densities and faster rotational spindle velocities.

Writing data to a data storage disk generally involves passing a current through the write element of the transducer to produce magnetic lines of flux which magnetize a specific location of the disk surface. Reading data from a specified disk location is typically accomplished by a read element of the transducer sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field emanating from the magnetized locations on the disk.

Conventional data storage systems generally employ a closed-loop servo control system to move the actuator arms to position the read/write transducers to specified storage locations on the data storage disk. During normal data storage system operation, a servo transducer, generally mounted proximate the read/write transducers, or, alternatively, incorporated as the read element of the transducer, is typically employed to read servo information for the purpose of following a specified track (track following) and seeking specified track and data sector locations on the disk (track seeking).

A servo writing procedure is typically implemented to initially prerecord servo pattern information on the surface of one or more of the data storage disks. A servo writer assembly is typically used by manufacturers of data storage systems to facilitate the transfer of servo pattern data to one or more data storage disks during the manufacturing process.

In one known servo technique, embedded servo pattern information is written to the disk along segments extending in a direction generally outward from the center of the disk. The embedded servo pattern is thus formed between the data storing sectors of each track. It is noted that a servo sector typically contains a pattern of data, often termed a servo burst pattern, used to maintain alignment of the read/write transducers over the centerline of a track when reading and writing data to specified data sectors on the track. The servo information may also include sector and track identification codes which are used to identify the position of the transducer. The embedded servo technique offers significantly higher track densities than dedicated servo, in which servo information is taken from one dedicated disk surface, since the embedded servo information is more closely co-located with the targeted data information.

In a further effort to increase disk capacity, a proposed servo information format was developed, termed pre-embossed rigid magnetic (PERM) disk technology. As described and illustrated in Tanaka et al., Characterization of Magnetizing Process for Pre-Embossed Servo Pattern of Plastic Hard Disks, I.E.E.E. Transactions on Magnetics 4209 (Vol. 30, No. 2, November 1994), a PERM disk contains embossed servo information in a number of servo zones spaced radially about the disk. Each servo zone contains pre-embossed recesses and raised portions to form a fine pattern, clock mark, and address code. The fine pattern and address code are used to generate servo information signals. To generate these servo information signals, the magnetization direction of the raised portions and the recesses must be opposite. The magnetization process involves first magnetizing the entire disk in one direction using a high-field magnet. Then, a conventional write head is used to magnetize the raised areas in the opposite direction.

While use of a PERM disk may increase disk capacity, such an approach suffers from a number of shortcomings. Servo information is provided on a PERM servo disk in a two-step magnetization process, as described above. This significantly increases the amount of time required to write servo information to the disk. Moreover, during the second step of the process, servo information is not yet available on the disk. Thus, an external positioning system must be employed, thereby increasing the cost of the servo writing process. Additional concerns associated with PERM disk technology include durability.

Finally, the PERM disk, like other embedded servo techniques, still stores servo information in disk space that could otherwise be used for data storage. As a result, PERM disk technology, although still at the research level, has not been widely accepted by industry.

Pre-embossed rigid thermal (PERT) disk technology uses the thermal response of a magnetoresistive (MR) head induced by servo information on a storage medium in order to position the MR head. As described in U.S. Pat. No. 5,739,972, issued Apr. 14, 1998 to Gordon J. Smith et al. and assigned to the assignee of the instant application, a PERT disk includes servo information provided to induce a thermal response in the MR head. The servo information is typically provided in the form of pre-embossed surface profile variations on the disk. A controller controls the relative position between the MR head and the embossed disk track using the thermal response induced in the MR head.

Typically in PERT disk technology, a read signal from an MR head is filtered to separate thermal and magnetic components. As disclosed in U.S. Pat. No. 6,088,176, issued Jul. 11, 2000 to Gordon J. Smith et al. and assigned to the assignee of the instant application, the thermal and magnetic components of a MR read signal are separated using a finite impulse response (FIR) filter. The thermal component is the thermal response of the MR head to the surface profile variations on the PERT disk. For the purpose of track following, for example, the surface profile variations may include serrated inner diameter (ID) and outer diameter (OD) track edges, which are radially aligned. For each track, the ID edge serration has a different serration frequency than the OD edge serration. By examining the frequency content of the thermal component of the read signal, the off-track direction and magnitude of the MR head can be determined and an appropriate control signal provided to the actuator to position the MR head over the centerline of a track. This multiple-frequency track serration arrangement provides improved track following without sacrificing data capacity of a disk. Unlike embedded servo techniques, this arrangement does not store servo information in disk space that could otherwise be used for data storage.

Thus, higher areal density can be achieved in varying degrees through the use of technologies such as embedded servo, PERM and PERT. However, such technologies can exacerbate the problem of catastrophic head-crash. As mentioned above, higher areal density combined with trend of reduced flyheights can increase the likelihood of catastrophic head-crash. Further exacerbating this problem is the concurrent trend of faster rotational spindle velocities. The problem of catastrophic head-crash may be overcome by monitoring the flyheight of a slider. Unfortunately, known techniques of monitoring flyheight typically are difficult to implement, not sufficiently accurate and/or require a large amount of computation.

There exists in the data storage system manufacturing industry a need for an enhanced method and apparatus for estimating the flyheight of an airbearing slider in a storage device. The present invention addresses this and other needs.

SUMMARY OF THE INVENTION

There are several aspects of the present invention, including a first aspect that relates to a storage disk, a second aspect that relates to a method of fabricating a storage disk, a third aspect that relates to a storage device, and a fourth aspect that relates to a method of estimating the flyheight of a slider in a storage device.

In accordance with one aspect of the present invention, there is provided a storage disk for use in a storage device having a transducer provided on a slider, a motor for rotating the storage disk relative to the transducer at a rated storage disk velocity, and an actuator provided to position the transducer relative to the storage disk. The slider floats on an airbearing over the storage disk as the storage disk rotates. The storage disk includes a washboard-sequence having a plurality of washboard-sections each comprising surface profile variations having a pitch different than that of the surface profile variations of other washboard-sections. The pitches are selected from within a range of values likely to excite an airbearing resonance of the slider as the storage disk rotates at the rated storage disk velocity.

Preferably, the washboard-sections are located on a wide-track band over which the slider floats when the actuator is leaning against an inside diameter (ID) or outside diameter (OD) crash-stop. Alternatively, the washboard-sections may be located on a wide-track band over which the slider floats when following servo information.

The washboard-sequence preferably includes observation-sections each comprising a relatively smooth surface profile interlaced between the washboard-sections. Preferably, the wide-track band includes more than one washboard-sequence.

Preferably, the surface profile variations of the washboard-sections each comprise a repeating pattern of generally radial mesas and pits, wherein the cross-section of the repeating pattern of generally radial mesas and pits is substantially square-wave-like or cosine-like.

The washboard-sequence on the storage disk may be used to estimate the flyheight of the slider. For each of the washboard-sections, a maximum amplitude of flyheight modulation of the slider resulting from the slider floating over that washboard-section is measured. A determination is made of which washboard-section caused the largest measured flyheight modulation, i.e., the washboard-section having a pitch that provides an excitation frequency (when the disk is rotated at the rated storage disk velocity) that is closest to the actual airbearing resonance frequency of the slider will produce the largest flyheight modulation. The result of this determination is used to estimate the flyheight of the slider. For example, the flyheight may be estimated using an empirical formula that relates the flyheight and the resonance frequency. Once the flyheight is estimated, a determination may be made of whether the flyheight is unsatisfactory, e.g., below a minimum flyheight or decreasing. Appropriate action may be taken when the flyheight is unsatisfactory, such as notifying the user and/or scrubbing the slider. Accordingly, catastrophic head-crash may be avoided and the useful life of the storage device extended.

In accordance with a second aspect of the present invention, there is provided a method of fabricating a storage disk for use in a storage device having a transducer provided on a slider, a motor for rotating the storage disk relative to the transducer at a rated storage disk velocity, and an actuator provided to position the transducer relative to the storage disk. The slider floats on an airbearing over the storage disk as the storage disk rotates. The method comprises the steps of providing a disk-shaped substrate and producing a washboard-sequence on a surface of the disk-shaped substrate. The washboard-sequence has a plurality of washboard-sections each comprising surface profile variations having a pitch different than that of the surface profile variations of other washboard-sections. The pitches are selected from within a range of values likely to excite an airbearing resonance of the slider as the storage disk rotates at the rated storage disk velocity.

The washboard-sequence produced on the surface of the storage disk may be used to estimate the flyheight of the slider. For each of the washboard-sections, a maximum amplitude of flyheight modulation of the slider resulting from the slider floating over that washboard-section is measured. A determination is made of which washboard-section caused the largest measured flyheight modulation, i.e., the washboard-section having a pitch that provides an excitation frequency (when the disk is rotated at the rated storage disk velocity) that is closest to the actual airbearing resonance frequency of the slider will produce the largest flyheight modulation. The result of this determination is used to estimate the flyheight of the slider. For example, the flyheight may be estimated using an empirical formula that relates the flyheight and the resonance frequency. Once the flyheight is estimated, a determination may be made of whether the flyheight is unsatisfactory, e.g., below a minimum flyheight or decreasing. Appropriate action may be taken when the flyheight is unsatisfactory, such as notifying the user and/or scrubbing the slider. Accordingly, catastrophic head-crash may be avoided and the useful life of the storage device extended.

Preferably, the fabrication method further comprises the step of applying a magnetic coating on the surface of the disk-shaped substrate having the washboard-sequence produced thereon. The step of producing the washboard-sequence preferably includes the step of lasing the surface of the disk-shaped substrate with a laser to form the surface profile variations of the washboard-sections. The lasing step may, for example, include the step of turning the laser on and off to form the surface profile variations of the washboard-sections as a repeating pattern of mesas and pits, the cross-section of which is substantially square-wave-like. Alternatively, the lasing step may include the step of modulating the power of the laser to form the surface profile variations of the washboard-sections as a repeating pattern of mesas and pits, the cross-section of which is substantially cosine-like.

In accordance with a third aspect of the present invention, there is provided a storage device having a storage disk, a transducer provided on a slider, an actuator provided to position the transducer relative to the storage disk, and a motor provided to rotate the storage disk relative to the transducer at a rated storage disk velocity. The slider floats on an airbearing over the storage disk as the storage disk rotates. The storage disk includes a washboard-sequence having a plurality of washboard-sections each comprising surface profile variations having a pitch different than that of the surface profile variations of other washboard-sections. The pitches are selected from within a range of values likely to excite an airbearing resonance of the slider as the storage disk rotates at the rated storage disk velocity.

The storage device may utilize the washboard-sequence to estimate the flyheight of the slider. For each of the washboard-sections, a maximum amplitude of flyheight modulation of the slider resulting from the slider floating over that washboard-section is measured. A determination is made of which washboard-section caused the largest measured flyheight modulation, i.e., the washboard-section having a pitch that provides an excitation frequency (when the disk is rotated at the rated storage disk velocity) that is closest to the actual airbearing resonance frequency of the slider will produce the largest flyheight modulation. The result of this determination is used to estimate the flyheight of the slider. For example, the flyheight may be estimated using an empirical formula that relates the flyheight and the resonance frequency. Once the flyheight is estimated, a determination may be made of whether the flyheight is unsatisfactory, e.g., below a minimum flyheight or decreasing. Appropriate action may be taken when the flyheight is unsatisfactory, such as notifying the user and/or scrubbing the slider. Accordingly, catastrophic head-crash may be avoided and the useful life of the storage device extended.

Preferably, the storage device further comprises a peak-amplitude detector provided to measure, for each of the washboard-sections, a maximum amplitude of flyheight modulation of the slider resulting from the slider floating over that washboard-section. The washboard-sequence preferably includes observation-sections each comprising a relatively smooth surface profile interlaced between the washboard-sections, the maximum amplitude of flyheight modulation resulting from each of the washboard-sections being measured by the peak-amplitude detector as the slider floats over an adjacent one of the observation-sections.

The storage device preferably further comprises means for estimating the flyheight of the slider based on the which of the washboard-sections caused the largest flyheight modulation. Preferably, the storage device further comprises a memory provided to store, for each of the washboard-sections, a section number and the measured maximum amplitude of flyheight modulation. In addition, the storage device preferably further comprises a logic circuit provided to determine the section number of the washboard-section that produced the largest measured maximum amplitude of flyheight modulation, and based on the determined section number, whether the flyheight of the slider is below a minimum flyheight. The logic circuit preferably further compares the determined section number and a previously determined section number, and based on the comparison, determines whether the flyheight of the slider is decreasing.

In accordance with a fourth aspect of the present invention, there is provided a method of estimating the flyheight of an airbearing slider in a storage device having a transducer provided on a slider, a motor for rotating the storage disk relative to the transducer at a rated storage disk velocity, and an actuator provided to position the transducer relative to the storage disk. The slider floats on an airbearing over the storage disk as the storage disk rotates. A washboard-sequence is provided having a plurality of washboard-sections each comprising surface profile variations having a pitch different than that of the surface profile variations of other washboard-sections. The pitches are selected from within a range of values likely to excite an airbearing resonance of the slider as the storage disk rotates at the rated storage disk velocity. For each of the washboard-sections, a maximum amplitude of flyheight modulation of the slider resulting from the slider floating over that washboard-section is measured. A determination is made of which washboard-section caused the largest measured flyheight modulation, i.e., the washboard-section having a pitch that provides an excitation frequency (when the disk is rotated at the rated storage disk velocity) that is closest to the actual airbearing resonance frequency of the slider will produce the largest flyheight modulation. The flyheight of the slider is estimated based on the determination step. For example, the flyheight may be estimated using an empirical formula that relates the flyheight and the resonance frequency. Once the flyheight is estimated, a determination may be made of whether the flyheight is unsatisfactory, e.g., below a minimum flyheight or decreasing. Appropriate action may be taken when the flyheight is unsatisfactory, such as notifying the user and/or scrubbing the slider. Accordingly, catastrophic head-crash may be avoided and the useful life of the storage device extended.

The estimating step preferably includes the steps of storing, for each of the washboard-sections, a section number and a measured maximum amplitude of flyheight modulation, and determining the section number of the washboard-section that produced the largest measured maximum amplitude of flyheight modulation.

Preferably, the method further comprises the step of determining whether the flyheight of the slider is below a minimum flyheight based on the determined section number. The method preferably further comprises the step of scrubbing the slider by reducing the storage disk velocity while the slider is floating over the washboard sequence, if it is determined that the flyheight of the slider is below the minimum flyheight. Preferably, the method further comprises the step of notifying a user if it is determined that the flyheight of the slider is below the minimum flyheight.

The method preferably further comprises the steps of comparing the determined section number and a previously determined section number and determining whether the flyheight of the slider is decreasing based on the comparison step. The method preferably further comprises the step of scrubbing the slider by reducing the storage disk velocity while the slider is floating over the washboard sequence, if it is determined that the flyheight of the slider is decreasing. Preferably, the method further comprises the step of notifying a user if it is determined that the flyheight of the slider is decreasing.

DETAILED DESCRIPTION OF THE PREFERRED EMBODIMENTS

Figure 1:
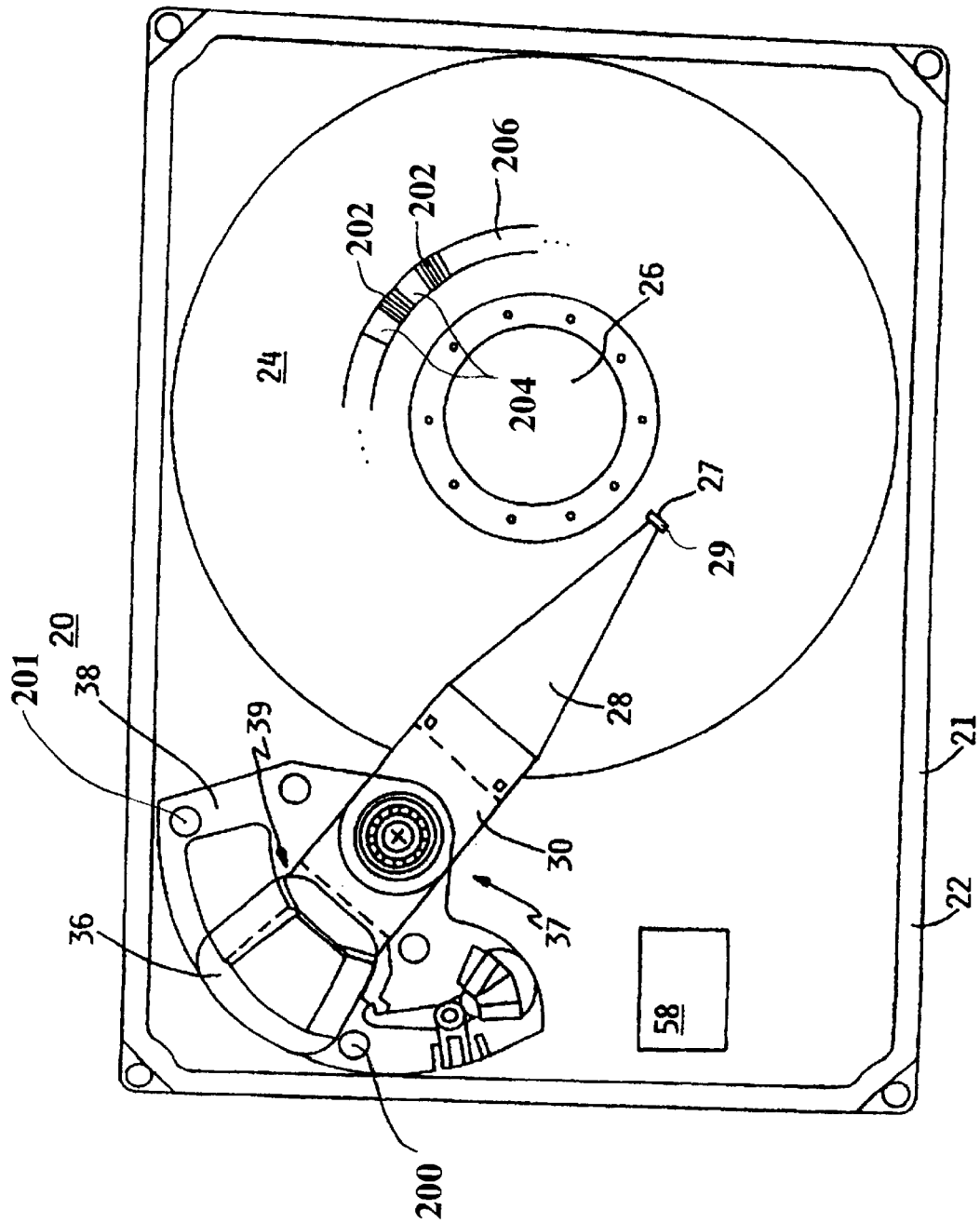
FIG. 1 is a top view of a data storage system with its upper housing cover removed.
Figure 2:
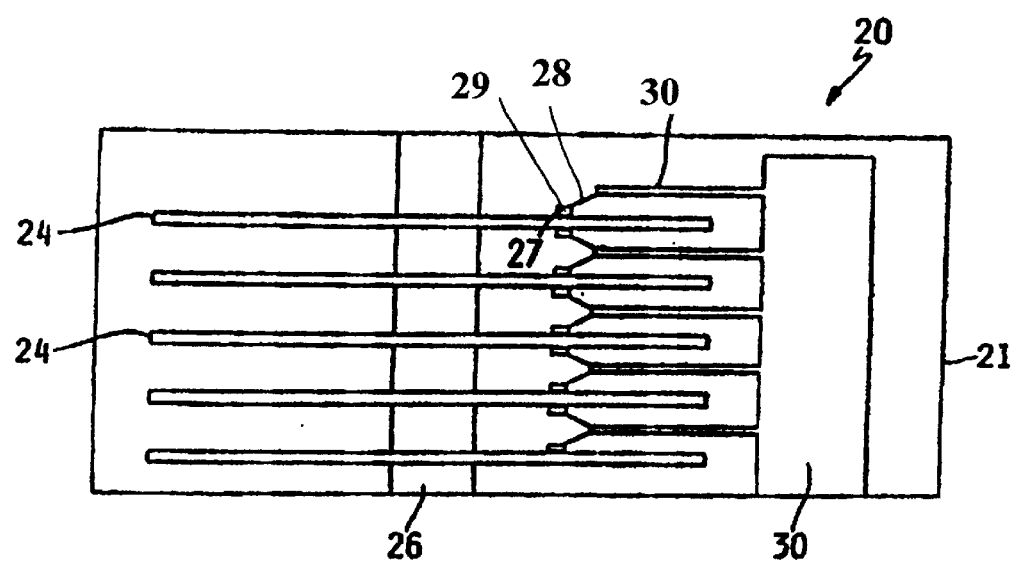
FIG. 2 is a side plan view of a data storage system comprising a plurality of data storage disks.

Referring now to the drawings, and more particularly to FIG. 1, there is shown a magnetic data storage system 20 with its cover (not shown) removed from the base 22 of the housing 21. As best seen in FIG. 2, the magnetic data storage system 20 typically includes one or more rigid data storage disks 24 which rotate about a spindle motor 26. The rigid data storage disks 24 are typically constructed with a metal, ceramic, glass, or plastic substrate upon which a recording layer is formed. In one typical construction, a magnetizable recording layer is formed on an aluminum or ceramic substrate. In another typical construction, an aluminum optical recording layer is formed on a plastic substrate.

Referring back to FIG. 1, an actuator assembly 37 typically includes a plurality of interleaved actuator arms 30, with each arm having one or more suspensions 28 and transducers 27 mounted on airbearing sliders 29. The transducers 27 typically include components both for reading and writing information to and from the data storage disks 24. Each transducer 27 may be, for example, a magnetoresistive (MR) head having a write element and a MR read element. Alternatively, each transducer may be an inductive head having a combined read/write element or separate read and write elements, or an optical head having separate or combined read and write elements. The actuator assembly 37 includes a coil assembly 36 which cooperates with a permanent magnet structure 38 to operate as an actuator voice coil motor (VCM) 39 responsive to control signals produced by controller 58. The controller 58 preferably includes control circuitry that coordinates the transfer of data to and from the data storage disks 24, and cooperates with the VCM 39 to move the actuator arms 30 and suspensions 28, to position transducers 27 to prescribed track and sector locations when reading and writing data from and to the disks 24. The movement of actuator arms 30 is limited by an inside diameter (ID) crash-stop 200 and an outside diameter (OD) crash-stop 201. When the actuator is leaning against the ID crash-stop 200, the transducers 27 are respectively positioned at the ID of the data storage disks 24. Similarly, when the actuator is leaning against the OD crash-stop 201, the transducers 27 are respectively positioned at the OD of the data storage disks 24.

An important aspect of the present invention, as discussed in more detail below, is that each surface of the data storage disks 24 includes a washboard-sequence having a plurality of washboard-sections 202. Briefly, at this point in the disclosure, it is instructive to note that each washboard-section 202 comprises surface profile variations having a pitch different from that of the surface profile variations of other washboard-sections 202. The pitches are selected from within a range of values likely to excite an airbearing resonance of the slider 29 as the storage disk 24 rotates at the rated storage disk velocity. Preferably, a plurality of observation-sections 204 are interlaced between the washboard-sections 202. The washboard-sections 202 are preferably located on a wide-track band 206 over which the slider 29 floats when the actuator is leaning against the ID crash-stop 200 or OD crash-stop 201. Alternatively, the washboard-sections 202 may be located on a wide-track band 206 over which the slider 29 floats when the transducer 27 is following servo information.

The washboard-sequence on the storage disk 24 may be used to estimate the flyheight of the slider 29, as discussed in more detail below. Briefly, at this point in the disclosure, it is instructive to note that for each of the washboard-sections 202, a maximum amplitude of flyheight modulation of the slider 29 resulting from the slider 29 floating over that washboard-section 202 is measured. A determination is made of which washboard-section 202 caused the largest measured flyheight modulation, i.e., the washboard-section 202 having a pitch that provides an excitation frequency (when the disk 24 is rotated at the rated storage disk velocity) that is closest to the actual airbearing resonance frequency of the slider 29 will produce the largest flyheight modulation. The result of this determination is used to estimate the flyheight of the slider 29. For example, the flyheight may be estimated using an empirical formula that relates the flyheight and the resonance frequency. Once the flyheight is estimated, a determination may be made of whether the flyheight is unsatisfactory, e.g., below a minimum flyheight or decreasing. Appropriate action may be taken when the flyheight is unsatisfactory, such as notifying the user and/or scrubbing the slider 29. Accordingly, catastrophic head-crash may be avoided and the useful life of the storage system 20 extended.

Not important with regard to the subject matter of the invention is the exact nature of the measurement of the flyheight modulation. The measurement may, for example, be made utilizing a magnetic, thermal or optical response of a transducer to head-to-disk spacing changes, or a combination of such responses.

For the purpose of illustration and not limitation, the thermal response of an MR head to head-to-disk spacing changes is discussed below. The present invention may optionally use such a thermal response. Alternatively, the present invention may use a magnetic response or an optical response, or a combination thereof, such as a combination of a thermal response and a magnetic response. In any event, the present invention is not limited to the use of a thermal response.

Figure 3:
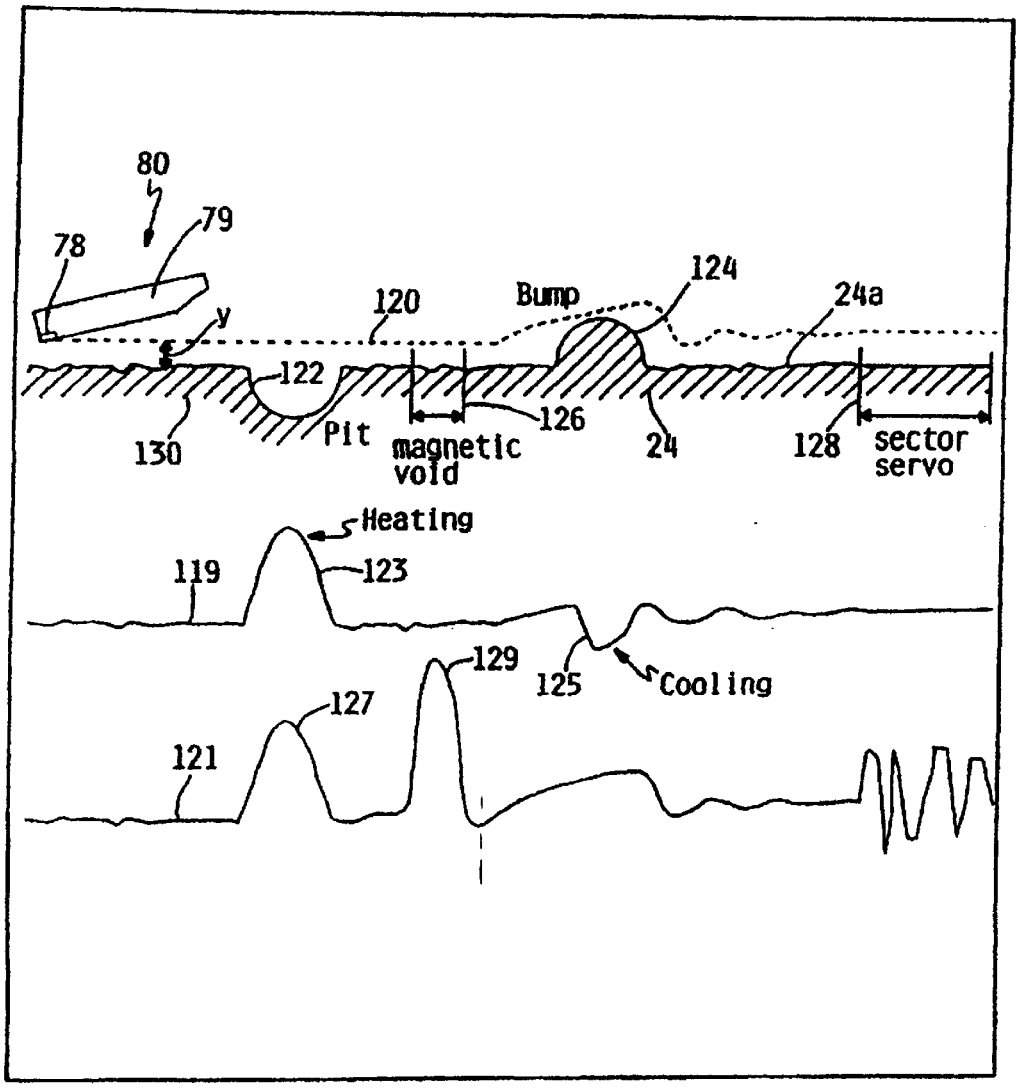
FIG. 3 is an exaggerated side view showing a data storage disk exhibiting various surface defects and features, and a thermal and magnetic response of an MR head to such defects and features.

In FIG. 3, there is illustrated an exaggerated side plan view of an MR head slider 79 flying in proximity with the surface 24a of a magnetic data storage disk 24. The disk surface 24a has a generally varying topography at the microscopic level, and often includes various surface defects, such as a pit 122, a bump 124, or a surface portion 126 void of magnetic material. It is known that the thermal response of an MR head 80 changes as a function of the spacing, denoted by the parameter (y), between an MR element 78 of the MR head 80 and the disk surface 24a. See, for example, U.S. Pat. No. 5,739,972, issued Apr. 14, 1998 to Gordon J. Smith et al. and assigned to the assignee of the instant application.

Head-to-disk spacing changes result in concomitant changes in heat transfer between the MR element 78 and disk 24. This heat transfer results in an alteration in the temperature of the MR element 78. Temperature changes to the MR element 78 result in corresponding changes in the electrical resistance of the MR element 78 and, therefore, the output voltage of the MR element 78.

As the instantaneous head-to-disk spacing (y) increases, there results a corresponding increase in the air space insulation between the MR head 80 and the disk surface 24a, thereby causing an increase in the temperature of the MR element 78. This temperature increase in the MR element 78 results in a corresponding increase in the MR element 78 resistance due to the positive temperature coefficient of the MR element material typically used to fabricate the MR element 78. Permalloy, for example, is a preferred material used to fabricate the MR element 78 and demonstrates a temperature coefficient of +3×10$^{-3}$/° C. An MR head 80 passing over a bump 124 on the disk surface 24a, by way of example, results in increased heat transfer occurring between the MR element 78 and the disk surface 24a, thereby causing cooling of the MR element 78. Such cooling of the MR element 78 causes a decrease in the MR element 78 resistance which, in turn, results in a corresponding decrease in the voltage $V_{TH}$ across the MR element 78 at a constant bias current.

It can be seen by referring to the pit 122 depicted on the disk surface 24a that the thermal voltage signal $V_{TH}$ 119 across the MR element 78 increases in amplitude as a function of increasing head-to-disk separation distance (y). In can further be seen by referring to the bump 124 depicted on the disk surface 24a that the thermal voltage signal $V_{TH}$ 119 decreases in amplitude as a function of decreasing head-to-disk separation distance. The thermal signal component of the readback signal, therefore, is in fact an information signal that can be used to detect the presence and relative magnitude of flyheight modulation.

Also shown in FIG. 3 is a magnetic spacing signal 121 which has been conditioned to correspond to variations in the disk surface 24a. For example, the negative logarithm of a magnetic signal obtained by passing the signal through a logarithmic device produces a magnetic spacing signal that is linearly related to the head-to-disk spacing. It can be seen that the magnetic spacing signal 121 incorrectly indicates the presence of some surface features, such as magnetic voids 126, as variations in the topography of the disk surface 24a. It can further be seen that the magnetic spacing signal 121 can provide an inferior indication of other surface features, such as bumps, when compared to disk surface imaging information provided by use of the thermal signal 119. Nevertheless, it may be desirable to use the magnetic response of a transducer to flyheight modulation in the present invention in lieu of the thermal response, or in combination with the thermal response.

As is well known in the art, the thermal component of an MR element readback signal may be extracted using conventional techniques to obtain information regarding the surface characteristics of the rotating disk 24. To provide a background, a brief discussion of a conventional technique that is well known in the art for extracting the thermal component is discussed below. Additional information regarding such conventional techniques may be found in, for example, U.S. Pat. No. 5,739,972, issued Apr. 14, 1998 to Gordon J. Smith et al. and assigned to the assignee of the instant application.

For purposes of the present invention, servo information need only be present on the surface of the disk 24 in applications that require the provision of a following capability, e.g., in applications where the ID or OD crash-stops are not used to position the slider 79 over the washboard-sections. Servo information, if present, may be encoded in a surface profile of the disk 24 and may be read using a transducer having an MR element, e.g., an MR head 80. Of course, traditional embedded magnetic servo information may be used within the scope of the invention in lieu of, or in addition to, surface profile servo information.

Figure 4:
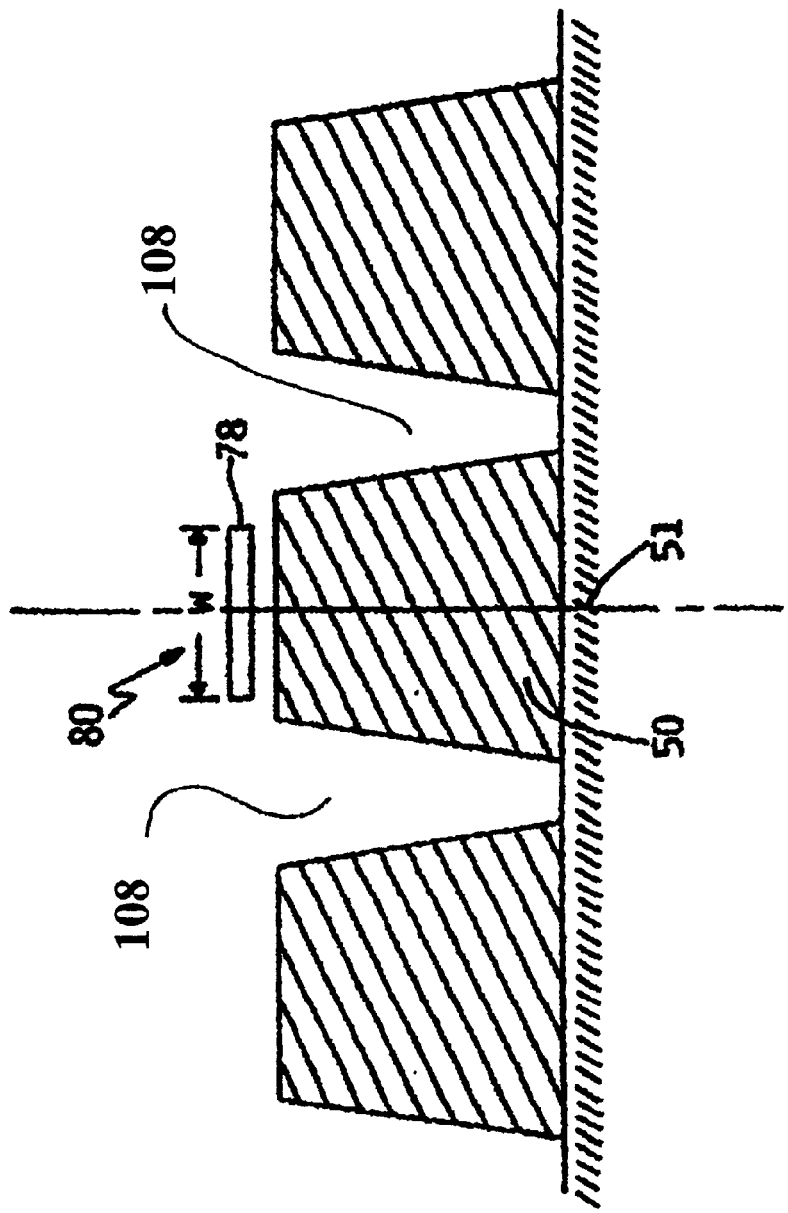
FIG. 4 is a cross-sectional view of a magnetoresistive element of a transducer in an on-track orientation over the centerline of a track of a disk.

Turning now to FIG. 4, which illustrates an example of the optional provision of a thermal following capability, there is shown a cross-section illustration of an MR element 78 of an MR head 80 oriented over the centerline 51 of a data track 50. Of course, for purposes of the present invention, the provision of a following capability is optional as discussed above. Conventionally, as the MR element 78 follows the track 50 of the surface 24a of rotating disk 24, magnetic transitions developed on the surface 24a of disk 24 result in the production of a readback signal (e.g., voltage signal) induced in the MR head 80. Similarly, flyheight modulation due to excitation of an airbearing resonance caused by the washboard-sections may be measured as the MR element 78 follows the track 50 of the surface 24a of rotating disk 24, using either the thermal or magnetic response of the MR element 78.

Figure 5:
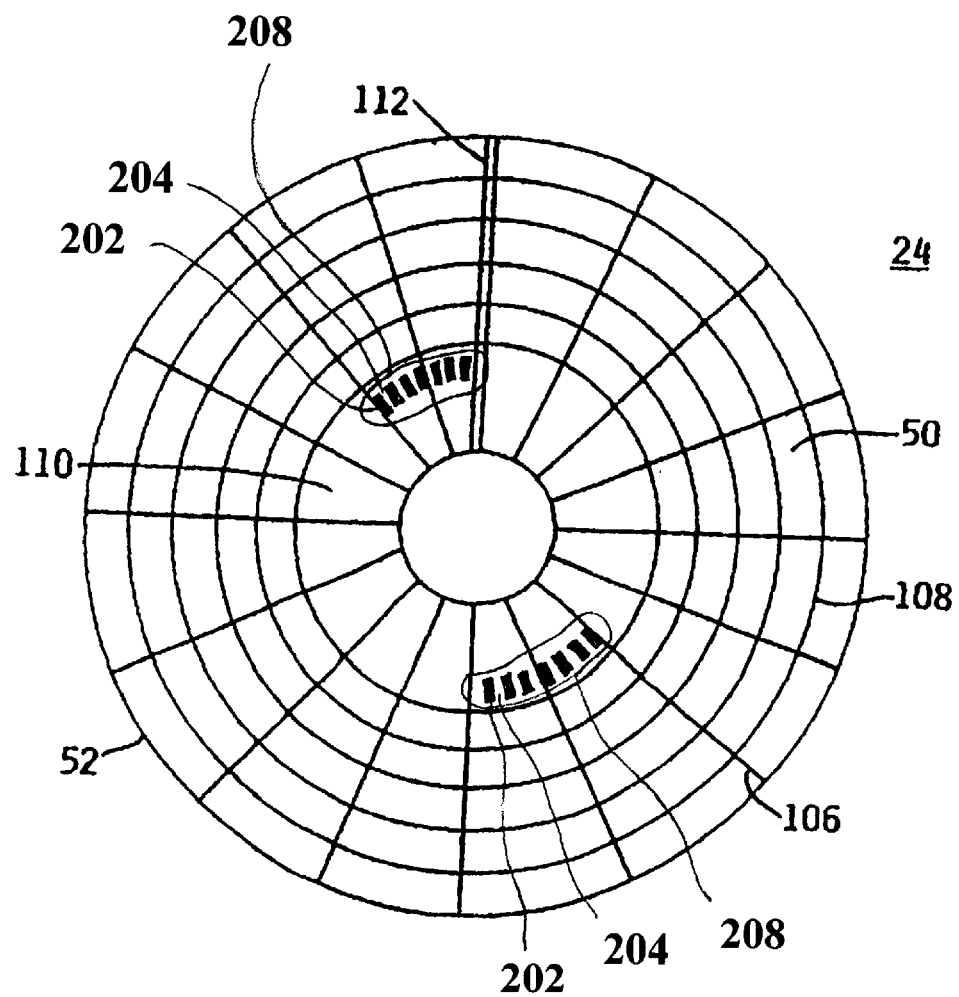
FIG. 5 is a top view of a disk having washboard-sequences, track markers, servo markers, a calibration zone and an index marker.

In FIG. 5, there is illustrated an exemplary disk 24 having optional pre-embossed or pre-etched track markers 108 and sector markers 106 for providing servo information on the disk 24 in the form of surface profile variations, e.g., head-to-disk spacing. These optional pre-embossed or pre-etched track markers 108 and the sector markers 106 may be formed using various techniques well known in the art, such as mask/photo lithographic, injection molding, stamping, laser-ablation, and sputtering techniques. The disk 24 is provided with concentric data tracks 50 used to store data. Alternatively, a non-concentric data track configuration, such as a spiral data track, may be used to store data. Each data track 50 may be partitioned into a series of sectors 52 that may be identified by the sector markers 106, for example. Adjacent data tracks 50 may be separated by track markers 108. The track markers 108 and the sector markers 106 may be formed as variations in the disk 24 which can be identified using either the thermal component or the magnetic component of the MR head readback signal. Alternatively, in lieu of using track markers 108 and sector markers 106, the tracks and sectors may be identified by conventional embedded magnetic servo information.

The track markers 108, which may be used to provide track-following servo information, are typically circumferential patterns of mesas and valleys providing head-to-disk spacing variations between adjacent data tracks 50. The mesas are typically the same height as the data tracks 50, while the valleys are typically formed as circumferential grooves in the surface 24a of the disk 24. The mesas and valleys accordingly define serrated inner diameter (ID) and outer diameter (OD) track edges. For each track 50, the ID edge serration preferably has a different serration frequency than the OD edge serration. By examining the frequency content of the thermal component of the read signal, the off-track direction and magnitude of the MR head can be determined and an appropriate control signal provided to the actuator to position the MR head over the centerline of a track 50. Additional information regarding such track markers and track-following techniques may be found in, for example, U.S. Pat. No. 5,739,972, issued Apr. 14, 1998 to Gordon J. Smith et al. and assigned to the assignee of the instant application.

As is conventional, the sector markers 106 may include Gray code patterns to give track, head, and sector location information. As is also conventional, the disk 24 may be provided with a calibration zone 110 and an index marker 112, which may be formed by a closely spaced pair of sector markers 106.

As mentioned above, an important aspect of the present invention is that each surface of the data storage disk 24 includes a washboard-sequence 208 having a plurality of washboard-sections 202. Preferably, a plurality of observation-sections 204 are interlaced between the washboard-sections 202. The washboard-sections 202 are preferably located as shown in FIG. 5 on a wide-track band at the inner diameter (ID) surface of the disk 24, i.e., the area over which the slider floats when the actuator is leaning against the ID crash-stop. Alternatively, the washboard-sections 202 may be located on a wide-track band over which the slider floats when the actuator is leaning against the OD crash-stop. In another alternative, the washboard-sections 202 may be located on a wide-track band over which the slider floats when the transducer is following servo information, such as track markers 108. As discussed in more detail below, the wide-track band preferably includes a plurality of washboard-sequences 208.

Figure 6:
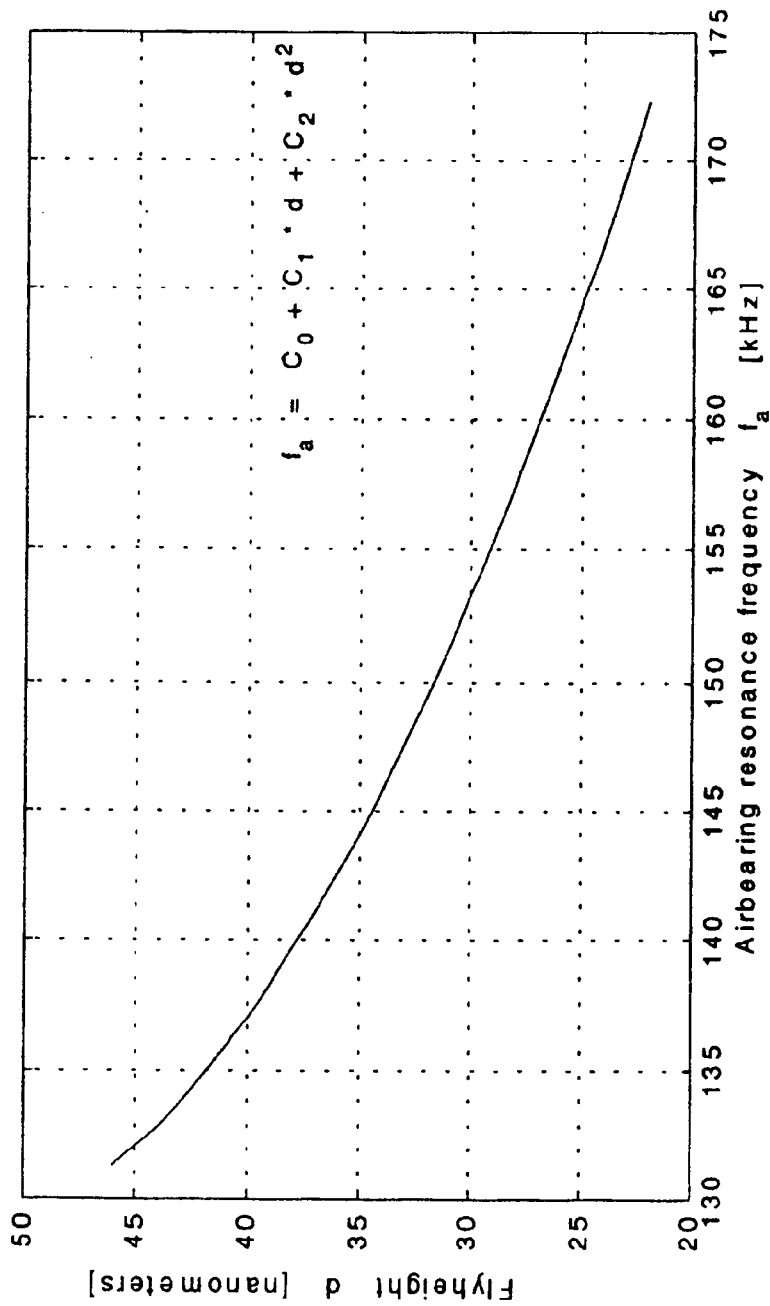
FIG. 6 is a graph of the flyheight of a slider versus the airbearing-resonance frequency of the slider.

In disk storage devices, a nonlinear inverse relationship between the flyheight and the slider airbearing resonance frequency is commonly observed. An example of an empirical formula that can be used to approximate this relationship follows. This example empirical formula is set forth for the purpose of illustration, and does not serve to limit the scope of the present invention. Other approximations may be used within the scope of the present invention. The nonlinear inverse relationship of the first-harmonic airbearing resonance frequency $f_a$ in terms of flyheight d for a typical hard disk drive at the inner diameter (radius=20.68 mm) can be approximated in a second-order polynomial form, for example, as $$f_a = C_0 + C_1 * d + C_2 * d^2, \qquad \text{Equations (1)}$$

where d is between 22 nm and 46 nm. Here the estimated frequency $f_a$ is in kHz and the flyheight d is in nm. The polynomial coefficients are given by $C_0=252.3692$, $C_1=-4.5642$ and $C_2=0.0420$ for the particular hard disk drive (HDD) model studied. Of course, these polynomial coefficients will vary with the characteristics, e.g., slider dimensions and geometry and the rated storage disk velocity, of the HDD model in question. A graphical plot of Equation (1) is shown in FIG. 6 for the particular HDD model studied. It can be seen that the nonlinear inverse relationship is almost linear.

From FIG. 6, it can be seen that it is possible to relate the airbearing resonance frequency to the approximate flyheight of the slider. For example, if the minimum acceptable flyheight is 30 nm, then a detected airbearing-resonance frequency of 160 kHz is indicative of a slider flying below the minimum acceptable flyheight. This is an important aspect of the present invention.

Accordingly, the present invention modulates a portion of the topography of the disk surface to excite the airbearing resonance of the slider in a safe and efficient manner. Once the airbearing resonance frequency $f_a$ of a given slider can be detected, then the approximate flyheight d can be estimated. This may be done by, for example, etching or embossing a constant-pitch washboard-pattern, preferably at least as wide as the airbearing slider pad, on a circumferential section the disk surface at a given disk radius r. The constant-pitch washboard-pattern is such that when the disk is rotating at the rated storage disk velocity, the frequency generated by the washboard-pattern is equal or close to the airbearing resonance frequency $f_a$ of a particular slider. Since the specific resonance frequency $f_a$ of each slider in a disk drive is only known within a wide tolerance, several circumferential washboard-sections, each having a different constant-pitch washboard-pattern, are preferably be used. Each of these washboard-sections will produce a different slider disturbance-frequency when the slider is flying over it.

In order for the slider to be "safe," mechanical contact with the disk surface is preferably avoided. Therefore, etching pits into the disk surface is preferred over making bumps that the slider must fly over. Bumps are much more prone to mechanical slider-contact than pits. Thus, a washboard-section consists of short (preferably, at least as wide as the airbearing slider pad) radial pits evenly spaced at a given pitch p. The washboard-sections may be, for example, approximately one hundred tracks wide in the radial direction. The washboard-pitch $p_k$ is computed from the formula $$p_k = \pi * r * RPM/30 * f_k (\text{meters}), \quad \text{Equation (2)}$$

where r is the track radius (meters), RPM is the rated storage disk velocity (revolutions per minute) and $f_k$ is the resulting disturbance frequency (hertz) when the slider is flying over the washboard-section at rated storage disk velocity.

Referring back to FIG. 5, several washboard-sections 202, each having a different washboard-pitch, are interlaced with observation-sections 204 and located in a washboard-sequence 208 on a wide-track band circumferentially at the inner diameter (ID) of the disk surface. As shown, more than one such washboard-sequence 208 is preferably included in the wide-track band. The observation-sections 204 are preferably smooth, flat, circumferential sections of the disk surface. Detection of the presence of the flyheight-modulation preferably occurs in the observation-sections 204.

The circumferential washboard-patterns are preferably produced on each of the disk surfaces at the disk-blank level. A magnetic coating may be applied after the washboard-patterns are produced. The detection is preferably made in the observation-sections either by using the thermal or the magnetic readback signal, or a combination thereof. In another alternative, detection may be made in the observation-sections using an optical signal provided by an inferometer, for example.

The magnetic signal, which is necessary only if the magnetic response is used, can be written, for example, at servo track write (STW) time, while the actuator arm is leaning against the ID crash-stop and the disk is rotating at a lower velocity, i.e., below the rated storage disk velocity. The reason for requiring a lower velocity is to avoid excitation of the airbearing resonance of the sliders. If not avoided, such excitation would cause flyheight variation and consequently make it difficult to write a magnetic pattern in the observation-sections. The airbearing resonance is present for a few airbearing resonance cycles before it settles out.

Alternatively, the washboard-pattern may be located at the outer diameter (OD) of the disk surface using the OD crash-stop. If load/unload ramps are used, then these ramps are preferably of the swing-away type to give access to the OD of the disk surfaces. In another alternative, the washboard-pattern may be positioned such that the ID or OD crash-stops are not used. In this case, each observation-section includes at least one servo sector.

In yet another alternative, a long washboard-pattern without observation-sections and having a varying-pitch (e.g., a chirp-like pitch) may be used. In this case, the flyheight modulation would be detected using the thermal readback signal.

Figure 7:
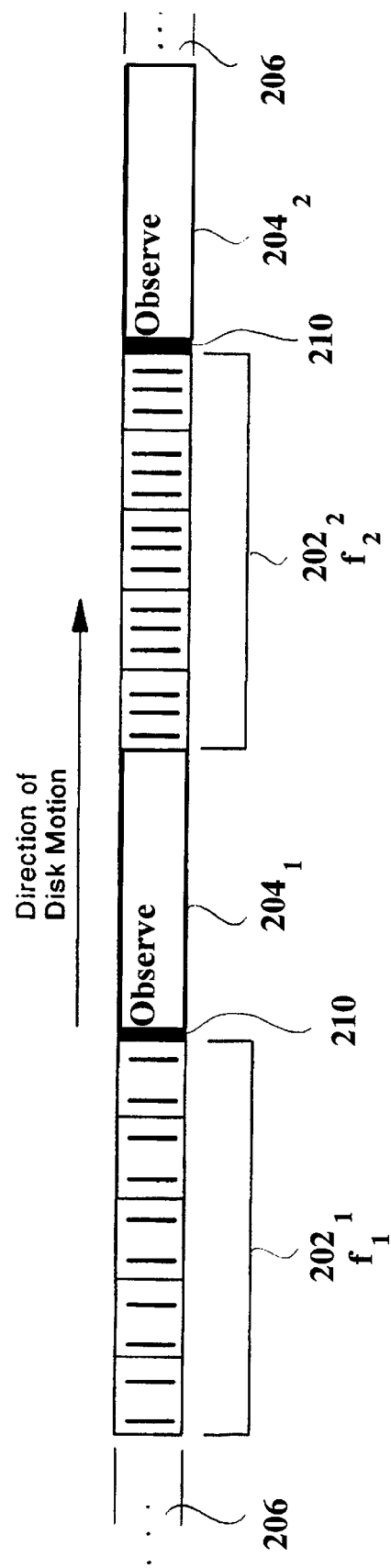
FIG. 7 is a top view of a portion of a washboard-sequence having two washboard-sections and two observation-sections.
Figure 8:
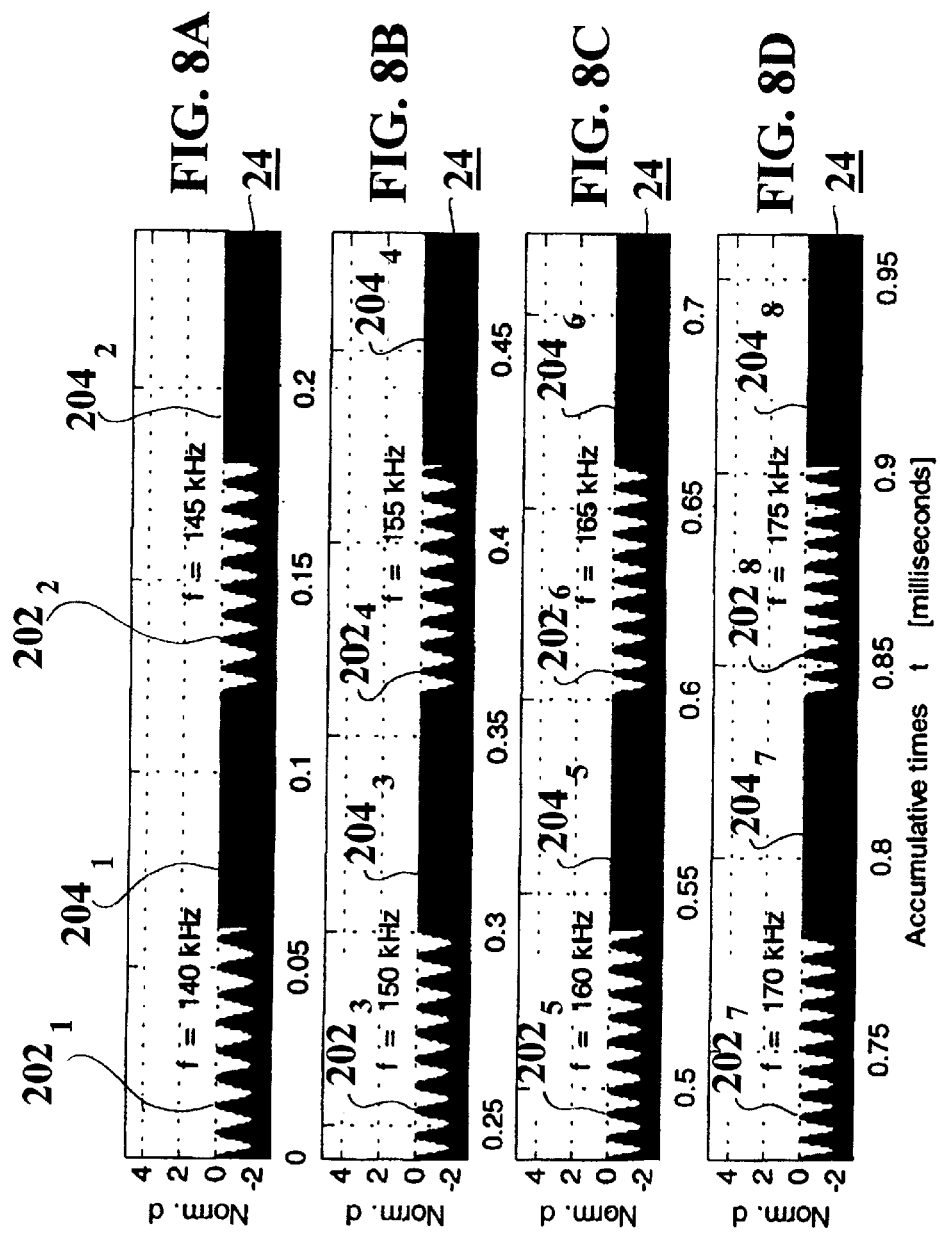
FIGS. 8A–8D are cross-sectional views of progressive portions of a washboard-sequence that includes eight washboard-sections each having a cosine-like cross-section pattern of different pitch.
Figure 9:
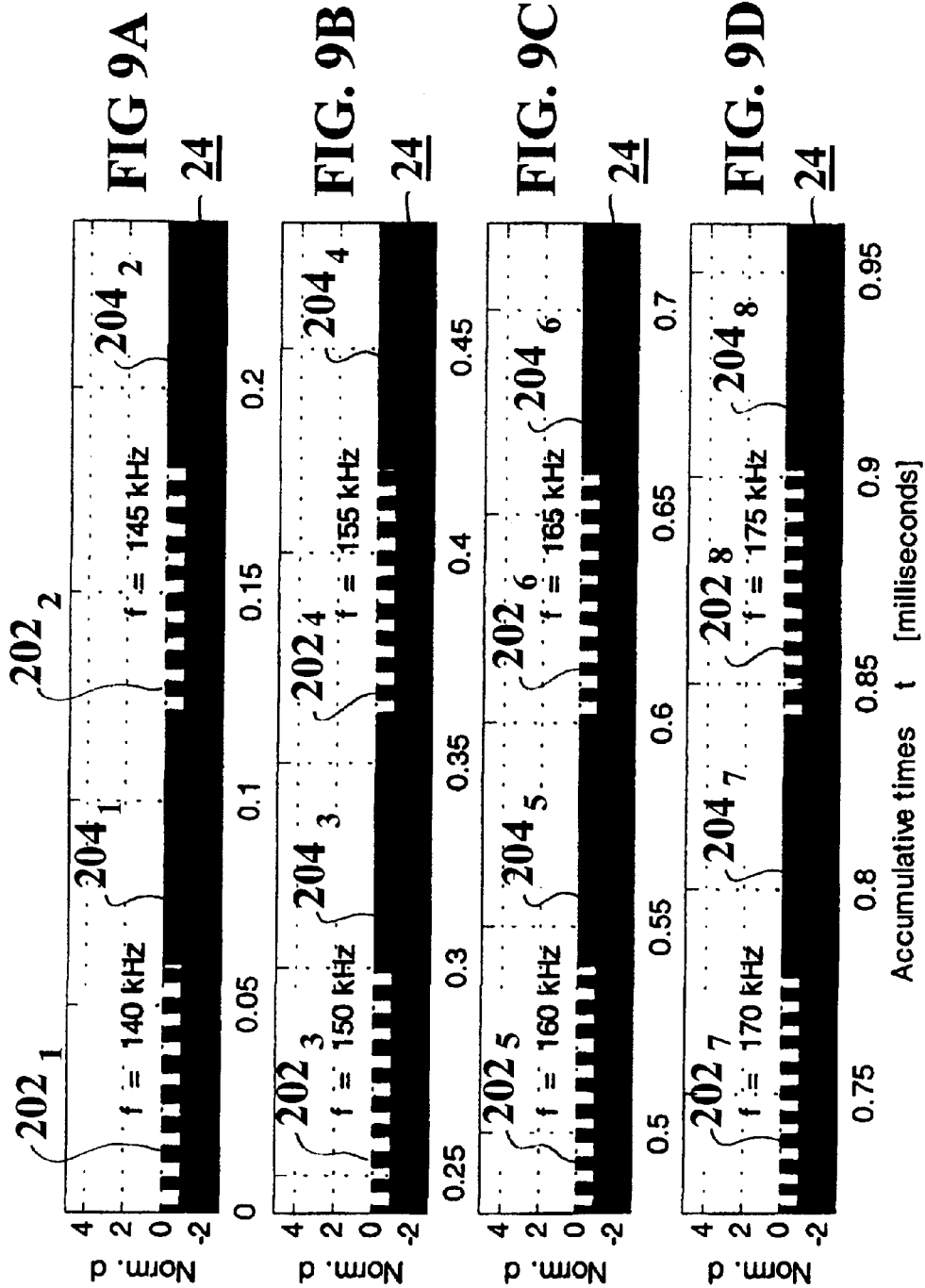
FIGS. 9A–9D are cross-sectional views of progressive portions of a washboard-sequence that includes eight washboard-sections each having a square-wave-like cross-section pattern of different pitch.

FIG. 7 shows an enlarged top view of a portion of a washboard-sequence. The washboard-sequence is provided on a pre-etched or pre-embossed wide-track band 206, which is much wider than a standard track. Pre-etched or pre-embossed washboard-sections $202_1$ and $202_2$ of different pitch respectively produce disturbance-frequencies $f_1$ and $f_2$, where $f_1 < f_2$ when the storage disk is rotated at the rated storage velocity. Corresponding observation-sections are labelled as $204_1$ and $204_2$. Each of the observation sections $204_1$ and $204_2$ may optionally include a servo sector 210, which may be a conventional embedded magnetic servo sector or a pre-embossed sector marker. The total number of washboard-section/observation section pairs may, for example, equal to the number of servo sectors. This need not be the case, however.

FIGS. 8A–8D and 9A–9D show progressive portions of cross-sections (cut circumferentially through the washboard-sequence) of two alternative pre-etched or pre-embossed washboard-sequences. FIGS. 8A–8D illustrate progressive portions of a single washboard-sequence that includes eight washboard-sections $202_1$–$202_8$ each having a cosine-like cross-section pattern of different pitch that will produce disturbance frequencies from 140 kHz to 175 kHz in 5 kHz increments. The cosine-like cross-section patterns can be produced, for example, by modulating the power of the laser beam as the disk blank is slowly rotating. Each washboard-section $202_1$–$202_8$ is respectively followed by an observation-section $204_1$–$204_8$. FIGS. 9A–9D are similar to FIGS. 8A–8D, but the cross-section of the patterns are square-wave-like. Here, there is no need to modulate the laser power continuously to produce the square-wave-like cross-section patterns. The laser can be, for example, either ON or OFF.

The pre-embossed or pre-etched washboard-sections 202 may be formed using various techniques well known in the art, such as mask/photo lithographic, injection molding, stamping, laser-ablation, and sputtering techniques. In general, laser methods offer relative simplicity and low cost. Laser methods are preferred when creating washboard patterns on metal or glass disk substrates, for example. Several examples of laser methods are described below.

a) laser ablation—ablation refers to the direct removal of material from a surface by the action of an intense laser pulse on that surface. In order for ablation to be efficient, the surface should strongly absorb the incident laser pulse. For glass disk substrates, strong absorption will occur in the deep ultraviolet (UV) part of the spectrum. Excimer lasers provide ample deep UV energy in a sufficiently short duration pulse (e.g., 10–15 nsec) to ablate glass at practical rates of up to hundreds of angstroms per pulse. Providing a patterned disk substrate by laser ablation may be accomplished using "direct write" or "image projection" processes. A direct write process uses a focussed and scanned beam to form the pattern where the laser light strikes the disk substrate surface. A computer-controlled galvanometer system directs the laser light according to the desired pattern. More efficient, however, is image projection patterning. Here, a mask containing the desired pattern information is illuminated by the laser light. By use of a high quality transfer lens, the image of the mask is transferred to the disk substrate surface. Ablation occurs in the illuminated regions. With UV laser light, pattern resolutions smaller than 1 μm are readily achieved.

b) laser etching—in contrast to ablation, laser etching requires some sort of chemical "developer" in addition to incident laser light. More often than not, the developer is a gas that will chemically react with the disk substrate surface, in the presence of laser photons, to form volatile compounds that remove surface material. For the case of glass etching, examples include: infrared $CO_2$ laser radiation with gases such as $NF_3$, $SF_6$ or HF; and ultraviolet Excimer laser radiation with gases such as $CF_2Br_2$ or $H_2$. Providing a patterned disk substrate by laser etching may be accomplished using direct write or image projection processes, which are described above with respect to laser ablation.

c) laser nano-bumping—laser bumping, or texturing, produces a raised relief surface topography, i.e., low profile "bumps" are created on the disk substrate surface wherever a laser pulse strikes. This is a well known method in the data storage industry for reducing head-media interface problems. The height, width, and spatial period of the bumps are controlled by the pulse energy, pulse duration, and pulse repetition frequency. For glass substrates, a $CO_2$ laser may be employed to transiently heat the surface of the disk substrate and create the bump. Bump heights from less than 5 nm to over 100 nm can be created using laser nano-bumping.

Figure 10:
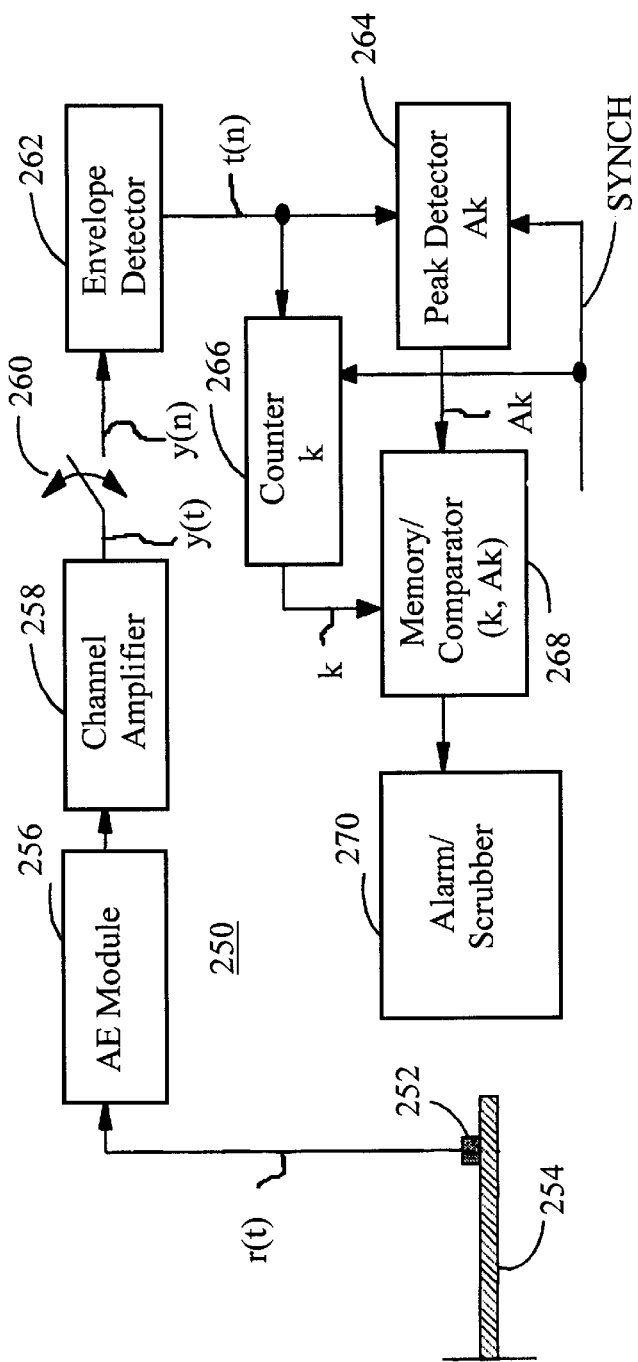
FIG. 10 is a block diagram of a flyheight estimating system.

FIG. 10 shows a block diagram of an embodiment of a flyheight estimating system 250 that utilizes a washboard-sequence having a plurality of washboard-sections provided on a surface of a storage disk. Although the flyheight estimating system 250 shown in FIG. 10 is implemented as a digital system, an equivalent analog system may also be used.

An MR head 252 flies over one surface of a rotating storage disk 254. The storage disk 254 is spun by spindle motor (not shown). The MR head 252 is attached to a suspension (not shown), the motion of which is controlled by an actuator (not shown). With the actuator leaning against the ID crash-stop (not shown), for example, the MR head 252 is positioned over a washboard-sequence (not shown) on one of the surfaces of the storage disk 254. As is conventional, the MR head 252 is provided with a bias current. The MR-readback signal r(t), at the provided bias current, is now mainly due to thermal activity caused by flyheight modulation (and any optional magnetic patterns written in the observation-sections (not shown)). That is, the MR-readback signal r(t) from the MR element of MR head 252 consists of a thermal component of low frequency content (and, if optional magnetic patterns are written in the observation-sections, a magnetic component of high frequency content due to the optional magnetic patterns). The MR-readback signal r(t) is passed through an arm electronics (AE) highpass amplifier module 256 and a channel amplifier 258. The channel amplifier output y(t) is sampled by an analog-to-digital converter (ADC) 260 at a sampling rate to produce a sampled sequence y(n). A typical sampling rate will be in excess of 100 megahertz (MHz). The sampled sequence y(n) is passed to an envelope detector 262, which extracts the effect of the flyheight modulation present in the thermal signal (or, alternatively, the magnetic signal if optional magnetic patterns are written in the observation-sections) during the observation-section.

The envelope detector 262 preferably comprises a thermal separator, which acts as a sophisticated lowpass filter that extracts and provides a thermal signal t(n). As is well known in the art, the thermal component of an MR-readback signal, such as the MR-readback signal r(t), may be extracted using conventional techniques. Such conventional techniques may be found in, for example, U.S. Pat. No. 5,739,972, issued Apr. 14, 1998 to Gordon J. Smith et al. and assigned to the assignee of the instant application.

In one such conventional thermal signal extraction technique, the sampled readback signal is provided to a first filter, e.g., an inverse infinite impulse response (IIR) filter, to compensate for the high pass filter in the AE module. The output of the first filter is passed through a second filter, e.g., a moving average low-pass finite infinite response (FIR) filter, to recover the thermal component of the sampled readback signal. Typically the FIR filter averages over several samples to provide a moving average.

Thus, in this conventional thermal signal extraction technique, the thermal separator includes an inverse IIR filter and a FIR filter. Of course, other techniques of extracting the thermal component may be used within the scope of the invention. That is, the present invention is neither limited to this particular conventional technique for extracting a thermal component nor the details thereof. In fact, the present invention is not limited to using a thermal response, e.g., a magnetic or optical response may be used in lieu of, or in addition to, the thermal response.

In another alternative embodiment, a magnetic spacing signal may be used instead of the thermal signal t(n) when magnetic patterns are written in the observation-sections. For example, envelope detector 262 may comprise a logarithmic device, rather than a thermal separator. In this alternative embodiment, the sampled readback signal is passed through the logarithmic device to produce a magnetic spacing signal that is linearly related to the head-to-disk spacing. The remainder of the flyheight estimating system 250 would remain unchanged in this alternative embodiment. In a further modification, it may be desirable to employ a both the magnetic response and the thermal response. For example, the thermal signal obtained from the thermal separator may be verified or calibrated using the magnetic spacing signal obtained from a logarithmic device.

The thermal signal t(n) is provided to a peak-amplitude detector 264 and a detector/counter 266. The maximum amplitude $A_k$ obtained during the k-th observation-section is measured by the peak-amplitude detector 264. The detector/counter 266 identifies the section number k associated with the k-th washboard-section that passes underneath the MR head 252. The detector/counter 266 is reset after the completion of all of the washboard-sections in the washboard-sequence. A spindle sync signal SYNCH is provided to ensure that peak-amplitude detector 264 and detector/counter 266 are gated correctly. The total number of washboard-sections and their corresponding washboard-pitch are known at manufacturing time within each washboard-sequence. The washboard-section number k is associated with a known disturbance frequency $f_k$.

In addition, the surfaces of each storage disk 254 may have more than one washboard-sequence per wide-track band. For example, one complete washboard-sequence may consist of ten washboard-sections interlaced with ten observation-sections, but will not take more space than one quarter of the wide-track band. In this case, the wide-track band may include two, three or four identical washboard-sequences. The purpose of the identical washboard-sequences is to make the measurement of the maximum amplitude $A_k$ more accurate through averaging. That is, the measurement of the maximum amplitude $A_k$ for each washboard-section may be averaged with those measurements for corresponding washboard-sections in identical washboard-sequences on the same wide-track band.

The section number k and maximum amplitude $A_k$ are provided to a memory/comparator 368. These washboard-section pairs $(k, A_k)$ are stored in memory/comparator 368 and compared to determine the section number k of washboard-section that produced the largest maximum amplitude $A_k$. The memory/comparator 368 also compares a given value $k_0$ representing a minimum flyheight and the section number k of the washboard-section determined to have produced the largest maximum amplitude $A_h$. If the determined section number k exceeds the given value $k_0$, then the slider is flying too low and appropriate action will be taken by alarm/scrubber 270. This comparison assumes that the washboard-sequence is arranged as a sequence of washboard-sections that consecutively increase in pitch. Of course, other arrangements are possible, and would require this comparison to change correspondingly.

The memory/comparator 368 is preferably a combined device that combines a memory and a logic circuit on a single chip. Alternatively, the memory/comparator 368 may be two separate devices, i.e., a memory and a logic circuit. In any event, the memory portion of the memory/comparator 368 is preferably a non-volatile memory so that its content may be retained after power is removed.

Preferably, the memory/comparator 368 stores a historic section number k' of the washboard-section that previously (e.g., when the storage device was manufactured or at some subsequent point in time) produced the largest maximum amplitude $A_{k'}$ for each slider. For each slider, the memory/comparator 368 compares the historic section number k' and a current section number k of the washboard-section currently determined to have produced the largest maximum amplitude $A_k$. Alternatively, the memory/comparator 368 may store a historic washboard-section pair (k', $A_{k'}$) for each slider. If the section number k for a given slider increases with time, then the slider is progressively flying lower and appropriate action will be taken by alarm/scrubber 270. Again, this comparison assumes that the washboard-sequence is arranged as a sequence of washboard-sections that consecutively increase in pitch. Of course, other arrangements are possible, and would require this comparison to change correspondingly.

The alarm/scrubber 270 takes appropriate action when the slider is progressively flying lower or is below the minimum flyheight. For example, the alarm/scrubber 270 may automatically scrub the slider (to remove debris) on the wide-track band by rotating the storage disk at low RPM, or may issue an alarm to the user notifying the user to perform this scrubbing operation. Alternatively, or in addition, the alarm/scrubber 270 may issue an alarm to the user notifying the user to replace the storage device after its stored data is backed up.

Figure 11:
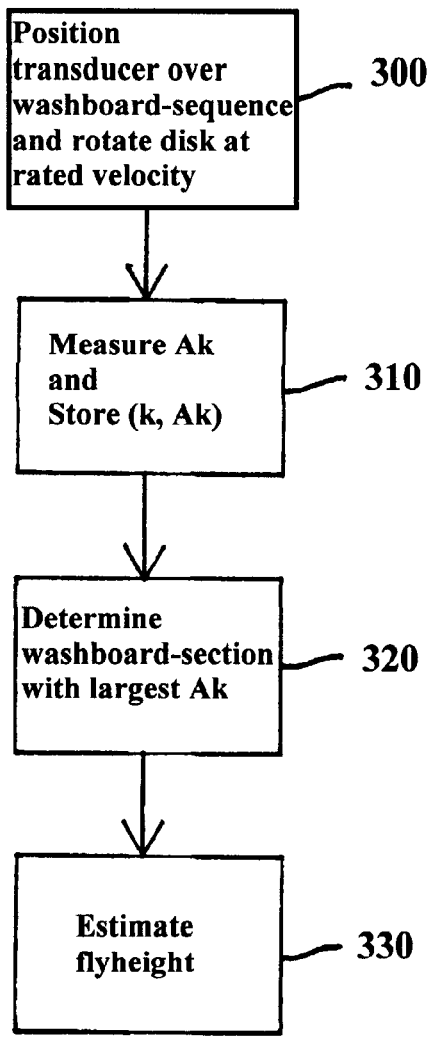
FIG. 11 is a flow diagram illustrating a method of estimating the flyheight of an airbearing slider in a storage device.

To further illustrate operation of the invention, a hypothetical example follows with reference to the flow diagram shown in FIG. 11.

EXAMPLE

The storage disk is rotated at the rated storage disk velocity and the airbearing sliders are positioned over the wide-track band that contains the pre-etched or pre-embossed washboard-sequence at step 300. This may be accomplished by positioning the actuator to lean against the inner diameter (ID) crash-stop, for example. The maximum amplitude of the flyheight modulation is measured and stored for each washboard-section, along with its section number at step 310. This measurement of the maximum amplitude of flyheight modulation is made for each washboard-section as the slider flies over the observation-section that follows that washboard-section. The washboard disturbance-frequency that is closest to the actual airbearing-resonance frequency will produce the largest flyheight modulation of the slider. Accordingly, the measured maximum amplitude values, one value for each of the washboard-sections in the washboard-sequence, are compared to determine the largest flyheight modulation at step 320. This process is repeated for each of the sliders. Knowledge of the washboard-pitch, and therefore the washboard disturbance-frequency, for each washboard-section and the determination of the largest flyheight modulation, allows for an effective way to determinate the actual airbearing-resonance frequency for a given slider. From this, the slider's flyheight may be estimated at step 330.

The storage disk in this example is spun at 10,000 RPM. The wide-track band that contains the washboard-sequence is located at the ID (radius≈20.0 mm) of the storage disk, such that the actuator can lean up against the ID crash-stop while the MR heads are positioned over the wide-track band for the whole disk revolution. The wide-track band is divided into 100 segments. The washboard-sequence occupies twenty of these segments, i.e., ten segments each having a washboard-section and ten segments each having an observation-section. The time duration of each washboard-section and observation-section, at the rated disk velocity, is 60 microseconds. Each washboard-section has a different pitch and all washboard-sections are interlaced by observation-sections. The ten washboard-sections have pitches such that they produce slider flyheight-disturbances at frequencies from 130 kHz to 175 kHz in 5 kHz increments at the rated disk velocity. The closer the flyheight-disturbance frequency is to the actual airbearing resonance frequency for a given slider, the larger the amplitude of the flyheight modulation.

To simulate the complex airbearing resonance process response to excitation of disturbances at different frequencies, we simply assume a second-order resonance with some damping. Observations in the actual hard disk drive (HHD) model studied in arriving at Equation (1), and its graphical plotted shown in FIG. 6, show the resonance modulation in the MR-readback signal settles out to about 10% of peak value in about four airbearing resonance-cycles. This corresponds to a damping ratio of approximately 0.1 or a "resonance-Q" of about five. In other words, the airbearing-resonance transfer function has a broad peak in frequency. The airbearing resonance frequency for the particular HDD model studied was typically around 150 kHz (i.e., near the center of the airbearing resonance frequency $f_a$ axis in the graphical plot shown in FIG. 6). Of course, this "nominal" airbearing resonance frequency will vary with the characteristics, e.g., slider dimensions and geometry and the rated storage disk velocity, of the HDD model in question. This corresponds to a cycle-period of 6.67 microseconds. Hence, the 60-microsecond duration of the observation-section at rated storage disk velocity, would be nine airbearing resonance-cycles long.

Hypothetical measurements from two sliders flying on the wide-track band are shown in Table 1 below. Column 1 shows the section number k, with the corresponding disturbance-frequency (in kHz) produced by the washboard-section in Column 2. Using the results of Equation (1) or the graphical plot shown in FIG. 6, Column 3 contains the estimated flyheights (in nanometers) corresponding to the frequencies found in Column 2. Columns 4 and 5 represent the normalized, peak-amplitude airbearing-modulation measurements made for each washboard-section, each measurement being made in the observation-section that follows the washboard-section. Each of these measurements may be a simple single measurement or may be an average of several measurements made over several revolutions, one slider at a time. Alternatively, these measurements may be averaged over a plurality of identical washboard-sequences contained in the wide-track band.

TABLE 1

| Washboard Section Number (#k) | Washboard Frequency (kHz) | Approximate Flyheight (nm) | Maximum Washboard Amplitude | |
|---|---|---|---|---|
| | | | Slider #1 $A_{k1}$ | Slider #2 $A_{k2}$ |
| 1 | 130 | 48 | 0.752 | 0.530 |
| 2 | 135 | 42 | 0.874 | 0.600 |
| 3 | 140 | 38 | 0.978 | 0.684 |
| 4 | 145 | 35 | 1.000 | 0.786 |
| 5 | 150 | 32 | 0.916 | 0.896 |
| 6 | 155 | 29 | 0.778 | 0.984 |
| 7 | 160 | 27 | 0.646 | 1.000 |
| 8 | 165 | 25 | 0.536 | 0.926 |
| 9 | 170 | 23 | 0.452 | 0.804 |
| 10 | 175 | 21 | 0.388 | 0.680 |

Inspection of Table 1 reveals for Slider #1 in Column 4, that the largest peak-amplitude value occurs for section number 4. Section number 4 corresponds to 145 kHz (Column 2) and a 35-nanometer flyheight (Column 3). Similarly, inspection of Table 1 reveals for Slider #2 in Column 5, that the largest peak-amplitude value occurs for section number 7. Section number 7 corresponds to 160 kHz (Column 2) and a 27-nanometer flyheight (Column 3).

If 30-nanometers were established as the minimum-safe-flyheight, this may be represented by assigning a given value $k_0=5$. That is, the given value $k_0$ represents the minimum-safe-flyheight in terms of a section number. Accordingly, the memory/comparator determines that Slider #1 is flying above the minimum-safe-flyheight (i.e., section number 4<given value 5) and Slider #2 is flying below the minimum-safe-flyheight (i.e., section number 7>given value 5). Consequently, the alarm/scrubber takes appropriate action with respect to Slider #2. For example, the alarm/scrubber may notify the operator that Slider #2 is flying below the minimum-safe-flyheight. The alarm/scrubber may also try to remove debris from the slider by flying the slider over the wide-track band at low RPM. By running the disk spindle at a low RPM, the flyheight of the slider is reduced such that the slider will make intermittent contact with the washboard-patterns of the wide-track band, and thereby attempt to loosen debris attached to the slider. After this scrubbing operation, the measurements in Column 5 of Table 1 are repeated to determine whether the scrubbing operation was successful. If there is no success, the recovery process may be repeated at an even lower RPM. Then, if there still is no success, the alarm/scrubber may notify the operator to replace the HDD after the stored data is backed up.

The washboard-section frequency range is selected so that the values are likely to excite an airbearing resonance of the slider as the storage disk rotates at the rated storage disk velocity. Preferably, the range extends substantially above and below the "nominal" airbearing resonance frequency so that the actual airbearing-resonance frequency of both high-flying and low-flying sliders can be measured. The range used in this example was 130kHz–175 kHz. Of course, other ranges, e.g., 120 kHz to 200 kHz, may be used. Enlarging the range as such increases the likelihood that the actual airbearing-resonance frequency for a particular slider will fall within the range.

Of course, if the slider dimensions are changed, the "nominal" airbearing-resonance frequency will change. As a consequence, the washboard-pitches used in the washboard-sequence will need to be changed. Changing the nominal storage disk velocity (RPM) will also require changes in the washboard-pitches used in the washboard-sequence. Accordingly, the washboard-pitches must be carefully selected for each unique HDD model. The selection of washboard-pitches may be based on, for example, measurement of the relationship between the flyheight and the slider airbearing resonance frequency for the particular HDD model in question. For the HDD model used in the example, this relationship is set forth in Equation (1) and graphically plotted in FIG. 6. The washboard-pitches that are effective depend on the characteristics, such as the slider dimensions and geometry and the rated storage disk velocity, of particular HDD model in question.

While this invention has been described with respect to the preferred and alternative embodiments, it will be understood by those skilled in the art that various changes in detail may be made therein without departing from the spirit, scope, and teaching of the invention. For example, the invention may be utilized in systems employing optical storage medium. Accordingly, the herein disclosed invention is to be limited only as specified in the following claims.

What is claimed is:

1. A storage disk for use in a storage device having a transducer provided on a slider, a motor for rotating the storage disk relative to the transducer at a rated storage disk velocity, and an actuator provided to position the transducer relative to the storage disk, the slider floating on an airbearing over the storage disk as the storage disk rotates, the storage disk comprising:

a washboard-sequence having a plurality of washboard-sections each comprising surface profile variations having a pitch different than that of said surface profile variations of other said washboard-sections, each said pitch being selected from within a range of values likely to excite an airbearing resonance of the slider as the storage disk rotates at the rated storage disk velocity.

2. The storage disk as recited in claim 1, wherein said washboard-sections are located on a wide-track band over which the slider floats when the actuator is leaning against an inside diameter (ID) or outside diameter (OD) crash-stop.

3. The storage disk as recited in claim 1, wherein said washboard-sections are located on a wide-track band over which the slider floats when following servo information.

4. The storage disk as recited in claim 1, wherein said washboard-sequence includes observation-sections each comprising a relatively smooth surface profile interlaced between said washboard-sections.

5. The storage disk as recited in claim 4, wherein said washboard-sequence is located on a wide-track band over which the slider floats when the actuator is leaning against an inside diameter (ID) or outside diameter (OD) crash-stop, said wide-track band including more than one said washboard-sequence.

6. The storage disk as recited in claim 4, wherein said washboard-sequence is located on a wide-track band over which the slider floats when following servo information, said wide-track band including more than one said washboard-sequence.

7. The storage disk as recited in claim 1, wherein said surface profile variations of each of said washboard-sections comprise a repeating pattern of generally radial mesas and pits.

8. The storage disk as recited in claim 7, wherein the cross-section of said repeating pattern of generally radial mesas and pits is substantially square-wave-like or cosine-like.

\* \* \* \* \*